United States Patent Office 2,868,785
Patented Jan. 13, 1959

2,868,785

10-(2-PYRROLIDYLALKYL) DERIVATIVES OF PHENOTHIAZINE

Douglas A. Shepherd, Kalamazoo, Mich., assignor to The Upjohn Company, Kalamazoo, Mich., a corporation of Michigan No Drawing. Application November 14, 1956
Serial No. 621,989

4 Claims. (Cl. 260—243)

This invention relates to new organic compounds and is particularly directed to 10-[2-(1-pyrrolidyl)ethyl]-phenothiazine N,5-dioxide and homologues thereof either as the free base or as an acid addition salt.

It is an object of the invention to provide novel physiologically active compounds. It is a further object to provide novel drug potentiators, antihistaminics, tranquilizers and diuretics. It is a further object to provide novel compounds which are safe and effective for these purposes and have a higher therapeutic index than the corresponding tertiary amines.

These and other objects are accomplished in the novel compounds of the invention which for the most part are represented by the following basic formula:

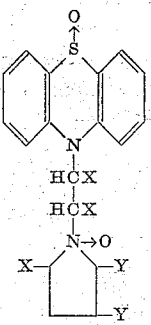

wherein X is a radical of the group consisting of hydrogen and lower alkyl radicals and Y is a radical of the group consisting of hydrogen and methyl radicals. The compounds represented by this formula can exist and can be used for the purposes of the invention in the form of the free base or an acid addition salt thereof with a pharmacologically acceptable acid such as hydrochloric, hydrobromic, hydriodic, sulfuric, phosphoric, nitric, acetic, benzoic, salicylic, glycolic, succinic, nicotinic, ascorbic, tartaric, maleic, malic, lactic acids, and the like.

The novel compounds of this invention are derivatives of the N-(pyrrolidylalkyl)-phenothiazines of U. S. Patents 2,483,998 and 2,483,999 and are prepared by reacting the free base with a peroxidizing agent, such as hydrogen peroxide, perbenzoic acid, perphthalic acid, peracetic acid, benzoyl peroxide, persulfuric acid, permonosulfuric (Caro's) acid, and ozone. The reaction advantageously is carried out in a solvent, aqueous ethanol, ethanol, aqueous acetone, acetone, aqueous acetic acid, and glacial acetic acid being suitable, and proceeds with satisfactory velocity at room temperature. Higher or lower temperatures, for example, from ten to 35 degrees centigrade, can be used, however.

The compounds of the invention possess diuretic activity and have the advantage of causing increased urine excretion without any essential change in the electrolyte composition of the urine. The parent compounds, i. e., the tertiary amines, on the other hand, have little if any diuretic activity. The relative efficiency of the compounds of the invention and the parent tertiary amines is shown in the following comparative test. 10-[2-(1-pyrrolidyl)ethyl]-phenothiazine N,5-dioxide and the parent tertiary amine, 10-[2-(1-pyrrolidyl)ethyl]-phenothiazine.HCl, were administered orally to rats in dosages of 5 and 10 mg./kg. The resultant diuresis, expressed as percentage increase in urine excretion over that of control rats, is shown in the following table:

| Compound | Dosage, mg./kg. | |
|---|---|---|
| | 5 | 10 |
| 10-[2-(1-pyrrolidyl)ethyl]-phenothiazine.HCl | 9 | 5 |
| 10-[2-(1-pyrrolidyl)ethyl]-phenothiazine N,5-dioxide | 48 | 71 |

The above data demonstrate that the N,5-dioxide is outstandingly more effective as a diuretic agent than the parent compound. Its superiority is enhanced still further by the fact that it is less toxic than the unoxygenated amine-sulfide. Hence the therapeutic index of the compounds of the invention is many times that of the parent compounds.

The invention may be more fully understood by the following examples which are illustrative only and are not to be construed as limiting.

EXAMPLE 1

*10-[2-(1-pyrrolidyl)ethyl]-phenothiazine N,5-dioxide free base*

A solution of 2.96 grams (0.01 mole) of 10-[2-(1-pyrrolidyl)ethyl]-phenothiazine free base and 2.5 grams of thirty percent aqueous hydrogen peroxide in sufficient absolute ethanol to make 25 milliliters was allowed to stand at room temperature. The disappearance of hydrogen peroxide was followed by iodimetric titration of one-milliliter aliquots. After 43 hours, 1.25 mole-equivalents of hydrogen peroxide had reacted, and the reaction had become extremely slow. The reaction solution remaining (72 percent of the original) was treated with 200 milligrams of manganese dioxide to destroy excess peroxide and was filtered. The filtrate, which gave a negative potassium iodide starch test, was concentrated under reduced pressure. The residue, a hard, glassy resin, on cooling, was crystallized from acetone. After drying overnight over potassium hydroxide-magnesium perchlorate at reduced pressure, the crystalline, hygroscopic, water-soluble 10-[2-(1-pyrrolidyl)ethyl]-phenothiazine N,5-dioxide free base, weighed 0.74 gram (31 percent) and had a micro melting point on a Kofler block of 156–158.5 degrees centigrade. The infrared spectrum was compatible with the proposed structure, having a band attributable to S→O at 1012 cm.$^{-1}$. Two recrystallizations from acetone afforded an analytical sample having a micro melting point on a Kofler block of 159–161 degrees centigrade.

*Analysis.*—Calcd. for $C_{18}H_{20}N_2O_2S$: C, 65.82; H, 6.14; N, 8.53; S, 9.76. Found: C, 65.64; H, 6.03; N, 8.57; S, 9.78.

EXAMPLE 2

*10-[2-(1-pyrrolidyl)ethyl]-phenothiazine N,5-dioxide hydrochloride*

Dry hydrogen chloride was passed into an ethanol solution of 10-[2-(1-pyrrolidyl)ethyl]-phenothiazine N,5-dioxide free base. Acetone was added to aid precipitation of the desired solid product, 10-[2-(1-pyrrolidyl)ethyl]-phenothiazine, N,5-dioxide hydrochloride, which was recovered by filtration and dried.

In place of hydrochloric acid there can be substituted appropriate acids to obtain the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like.

By substituting in Examples 1 and 2 the free bases of the various N-(pyrrolidylalkyl)-phenothiazines disclosed in U. S. Patents 2,483,998 and 2,483,999, there are obtained the corresponding N,5-dioxides, first as the free base according to the procedure of Example 1 and as the hydrochloride according to the procedure of Example 2. The following examples are illustrative.

Example 3

N-[2-(2,4-dimethylpyrrolidino)-propyl]-phenothiazine N,5-dioxide free base

By substituting N - [2 - (2,4 - dimethylpyrrolidino)-propyl]-phenothiazine free base for 10-[2-(1-pyrrolidyl)-ethyl]-phenothiazine free base in Example 1, there is obtained N - [2 - (2,4 - dimethylpyrrolidino) - propyl]-phenothiazine N,5-dioxide free base.

Example 4

N-[2-(2,4-dimethylpyrrolidino)-propyl]-phenothiazine N,5-dioxide hydrochloride

By substituting N - [2 - (2,4 - dimethylpyrrolidino)-propyl]-phenothiazine N,5-dioxide free base for 10-[2-(1-pyrrolidyl) - ethyl] - phenothiazine N,5 - dioxide free base in Example 2, there is obtained N-[2-(2,4-dimethylpyrrolidino)-propyl]-phenothiazine N,5-dioxide hydrochloride.

In place of hydrochloric acid there can be substituted appropriate acids to obtain the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like.

Example 5

N-[2-(2,4-dimethylpyrrolidino)ethyl]-phenothiazine N,5-dioxide free base

By substituting N - [2 - (2,4 - dimethylpyrrolidino) ethyl]-phenothiazine free base for 10-[2-(1-pyrrolidyl) ethyl]-phenothiazine free base in Example 1, there is obtained N - [2 - (2,4 - dimethylpyrrolidino)ethyl]-phenothiazine N,5-dioxide free base.

Example 6

N-[2-(2,4-dimethylpyrrolidino)ethyl]-phenothiazine N,5-dioxide hydrochloride

By substituting N - [2 - (2,4 - dimethylpyrrolidino) ethyl]-phenothiazine N,5-dioxide free base for 10-[2-(1-pyrrolidyl)-ethyl]-phenothiazine N,5-dioxide free base in Example 2, there is obtained N-[2-(2,4-dimethylpyrrolidino)ethyl]-phenothiazine N,5-dioxide hydrochloride.

In place of hydrochloric acid there can be substituted appropriate acids to obtain the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like.

Example 7

N-[2-(2,5-dimethylpyrrolidino)ethyl]-phenothiazine N,5-dioxide free base

By substituting N - [2 - (2,5 - dimethylpyrrolidino) ethyl]-phenothiazine free base for 10,-[2-(1-pyrrolidyl) ethyl]-phenothiazine free base in Example 1, there is obtained N - [2 - (2,5 - dimethylpyrrolidino)ethyl] - phenothiazine N,5-dioxide free base.

Example 8

N-[2-(2,5-dimethylpyrrolidino)ethyl]-phenothiazine N,5-dioxide hydrochloride

By substituting N - [2 - (2,5 - dimethylpyrrolidino) ethyl]-phenothiazine N,5-dioxide free base for 10-[2-(1-pyrrolidyl)-ethyl]-phenothiazine N,5-dioxide free base in Example 2, there is obtained N-[2-(2,5-dimethylpyrrolidino)ethyl]-phenothiazine N,5-dioxide hydrochloride.

In place of hydrochloric acid there can be substituted appropriate acids to obtain the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like.

Example 9

N-(2-pyrrolidinopropyl)-phenothiazine N,5-dioxide free base

By substituting N - (2 - pyrrolidinopropyl) - phenothiazine free base for 10-[2-(1-pyrrolidyl)ethyl]-phenothiazine free base in Example 1, there is obtained N-(2-pyrrolidinopropyl)-phenothiazine N,5-dioxide free base.

Example 10

N-(2-pyrrolidinopropyl)-phenothiazine N,5-dioxide hydrochloride

By substituting N - (2 - pyrrolidinopropyl) - phenothiazine N,5-dioxide free base for 10-[2-(1-pyrrolidyl) ethyl]-phenothiazine N,5-dioxide free base in Example 2, there is obtained N-(2-pyrrolidinopropyl)-phenothiazine N,5-dioxide hydrochloride.

In place of hydrochloric acid there can be substituted appropriate acids to obtain the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like.

Example 11

N-[2-(2,5-dimethylpyrrolidino)propyl]-phenothiazine N,5-dioxide free base

By substituting N-[2-(2,5-dimethylpyrrolidino)propyl]-phenothiazine free base for 10-[2-(1-pyrrolidyl)-ethyl]-phenothiazine free base in Example 1, there is obtained N-[2-(2,5 - dimethylpyrrolidino)propyl] - phenothiazine N,5-dioxide free base.

Example 12

N-[2-(2,5-dimethylpyrrolidino)propyl]-phenothiazine N,5-dioxide hydrochloride

By substituting N-[2-(2,5-dimethylpyrrolidino)propyl]-phenothiazine N,5-dioxide free base for 10-[2-(1-pyrrolidyl)-ethyl]-phenothiazine N,5-dioxide free base in Example 2, there is obtained N-[2-(2,5-dimethylpyrrolidino)propyl]-phenothiazine N,5-dioxide hydrochloride.

In place of hydrochloric acid there can be substituted appropriate acids to obtain the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like.

The novel compounds of this invention can be used for the same purposes and in the same dosage forms, such as tablets, injectables, and elixirs, as 10-[2-(1-pyrrolidyl)-ethyl]-phenothiazine and the salts thereof.

This application is a continuation-in-part of my now abandoned applications Serial Nos. 528,815 and 579,436, filed August 16, 1955, and April 20, 1956, respectively.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 10-[2-(1-pyrrolidyl)ethyl] - phenothiazine N,5 - dioxide acid addition salt of a pharmacologically acceptable acid.

2. 10-[2-(1-pyrrolidyl)ethyl] - phenothiazine N,5 - dioxide hydrochloride.

3. Compounds having the following general structural formula:

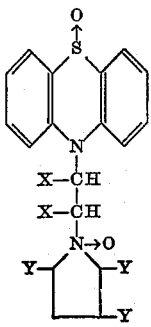

wherein X is selected from the group consisting of hydrogen and lower-alkyl and Y is selected from the group consisting of hydrogen and methyl, and the pharmacologically acceptable acid addition salts thereof.

4. The N,5-dioxide of 10-(2-pyrrolidylethyl)phenothiazine.

References Cited in the file of this patent

UNITED STATES PATENTS

| | | |
|---|---|---|
| 2,483,999 | Hunter et al. | Oct. 4, 1949 |
| 2,590,125 | Robinson et al. | Mar. 25, 1952 |
| 2,591,679 | Cusic | Apr. 8, 1952 |
| 2,629,719 | Cusic | Feb. 24, 1953 |
| 2,645,640 | Charpentier | July 14, 1953 |
| 2,687,414 | Cusic | Aug. 24, 1954 |

UNITED STATES PATENT OFFICE
Certificate of Correction

Patent No. 2,868,785                              January 13, 1959

Douglas A. Shepherd

It is hereby certified that error appears in the printed specification of the above numbered patent requiring correction and that the said Letters Patent should read as corrected below.

Column 1, lines 37 to 41, lower portion of the formula, for

column 3, line 53, for "N-[2-2,4-" read —N-[2-(2,4- —; line 66, for "10,-[2-" read —10-[2- —.

Signed and sealed this 21st day of July 1959.

[SEAL]

Attest:
KARL H. AXLINE,
*Attesting Officer.*

ROBERT C. WATSON,
*Commissioner of Patents.*